United States Patent [19]

van der Vegt

[11] Patent Number: 4,692,495
[45] Date of Patent: Sep. 8, 1987

[54] REINFORCED POLYMER PRODUCT, METHOD FOR MANUFACTURING A REINFORCED POLYMER PRODUCT OF THIS TYPE AND A PLASTIC COMPOUND SUITABLE FOR PRODUCING SUCH A REINFORCED POLYMER PRODUCT

[75] Inventor: Anne K. van der Vegt, Delft, Netherlands

[73] Assignee: Trchnische (Rijks) Hogeschool, Delft, Netherlands

[21] Appl. No.: 512,768

[22] Filed: Jul. 11, 1983

[30] Foreign Application Priority Data

Jul. 12, 1982 [NL] Netherlands ........................ 82 02813

[51] Int. Cl.$^4$ ...................... C08L 23/06; C08L 23/12; C08L 33/22; C08L 68/00
[52] U.S. Cl. ..................................... 525/184; 525/239; 525/240; 525/241; 525/433
[58] Field of Search ............... 525/240, 239, 231, 184, 525/935, 433, 241

[56] References Cited

U.S. PATENT DOCUMENTS

| | | | |
|---|---|---|---|
| 4,365,044 | 12/1982 | Liu | 525/240 |
| 4,366,292 | 12/1982 | Werner et al. | 525/240 |
| 4,378,451 | 3/1983 | Edwards | 525/240 |
| 4,394,235 | 7/1983 | Brandt et al. | 525/240 |
| 4,395,519 | 7/1983 | Minami et al. | 525/240 |

Primary Examiner—Allan M. Lieberman
Attorney, Agent, or Firm—Fiddler & Levine

[57] ABSTRACT

A mixture of a basic thermoplastic and of a more orientatable and crystallizable reinforcing polymer is extruded through a nozzle of an extruder or of an injection molding machine, and these molten elements have a temperature in the nozzle of about the melting temperature of the polymer, to at most 10° C. thereabove.

The reinforced polymer product presents excellent strength properties.

5 Claims, 2 Drawing Figures

REINFORCED POLYMER PRODUCT, METHOD FOR MANUFACTURING A REINFORCED POLYMER PRODUCT OF THIS TYPE AND A PLASTIC COMPOUND SUITABLE FOR PRODUCING SUCH A REINFORCED POLYMER PRODUCT

BACKGROUND OF THE INVENTION

The invention relates to a reinforced polymer product obtained by extrusion or injection molding, comprising a basic thermoplastic and a reinforcing fibrous polymer element incorporated therein.

It is known per se that polymer products, obtained by extrusion or injection molding possess a relatively low rigidity and only small strength, so that for certain practical applications reinforcing products have to be incorporated into these polymer products.

However, these reinforced polymer products do not meet the required high strength as demanded nowadays by the customer.

SUMMARY OF THE INVENTION

The present invention aims to provide a reinforced polymer product of the abovementioned type, in which these disadvantages do not arise as the elements of a reinforcing polymer are obtained during the manufacture of the polymer product under particular conditions.

This object is achieved according to the invention in that the reinforcing polymer elements consist of oblong elements of a reinforcing polymer being more orientated and crystallized than the basic plastic, said elements at least having partially molecularly been orientated during the formation of the polymer products by conveying the plasticized basic plastic, surrounding the still liquid elements of the reinforcing polymer at a temperature of at most 10° C. above the melting point of the reinforcing polymer when passing through the nozzle.

The orientation of a reinforcing crystallizable polymer provides stretched oblong elements extremely enhancing the strength properties of the reinforced polymer product. Additionally, after their molecular orientation, said oblong elements form parallel fibers providing an optimum reinforcement in the fiber direction.

During the formation of the oblong elements in the surrounding basic plastic, the molecular chains of the reinforcing crystallizable polymer are orientated to a great degree by stretching and particularly optimum results are obtained by rapid crystallization of the crystallizable orientated polymer.

The reinforced polymer products according to the invention may be easily obtained in that the orientated polymer is able to crystallize spontaneously at a temperature near the melting point, whereas the reinforcing crystallizable polymer of the oblong elements in a non orientated state would only crystallize at a substantial supercooling which may be even some tenths of a degree centigrade below the melting point.

A suitable selection of temperature and transport velocity through the zone for forming the reinforced plastic products, may therefore provide a strong stretching together with a very high degree of orientation, so that an extremely strong and rigid reinforcing element will be obtained.

In a very advantageous manner, the reinforcing more strongly orientatable and crystallizable polymers are crystallized on being discharged from the nozzle of an injection molding apparatus or an extruder.

Preferably a stretching of the oblong elements is obtained during the transport of the compounds of the plasticized basic plastic and an element of a crystallizable reinforcing polymer, more particularly during the transport through an extrusion nozzle having the abovementioned temperature.

Very advantageously, the basic plastic and the more orientatable and crystallizable polymer may be coextruded, to obtain a product having optimum properties. The oblong elements may also consist of a crosslinked crystallizable reinforcing polymer.

According to a very preferred embodiment the reinforcing polymer of the oblong elements in the polymer product consists of single crystals.

Figure 1:
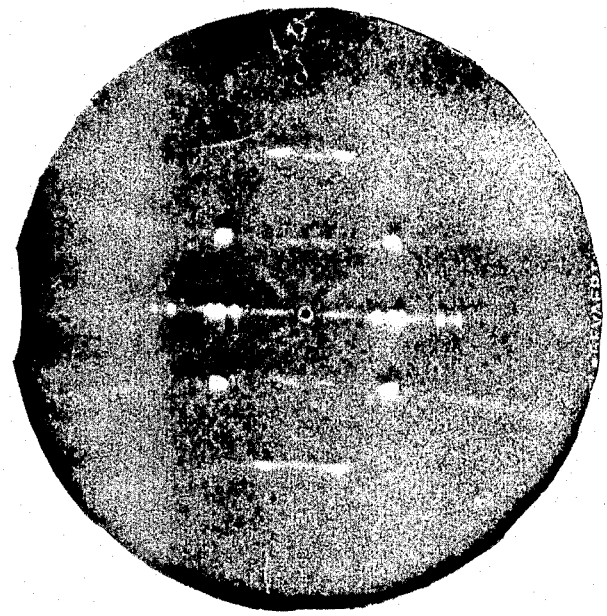
FIG. 1 is an x-ray diagram.
Figure 2:
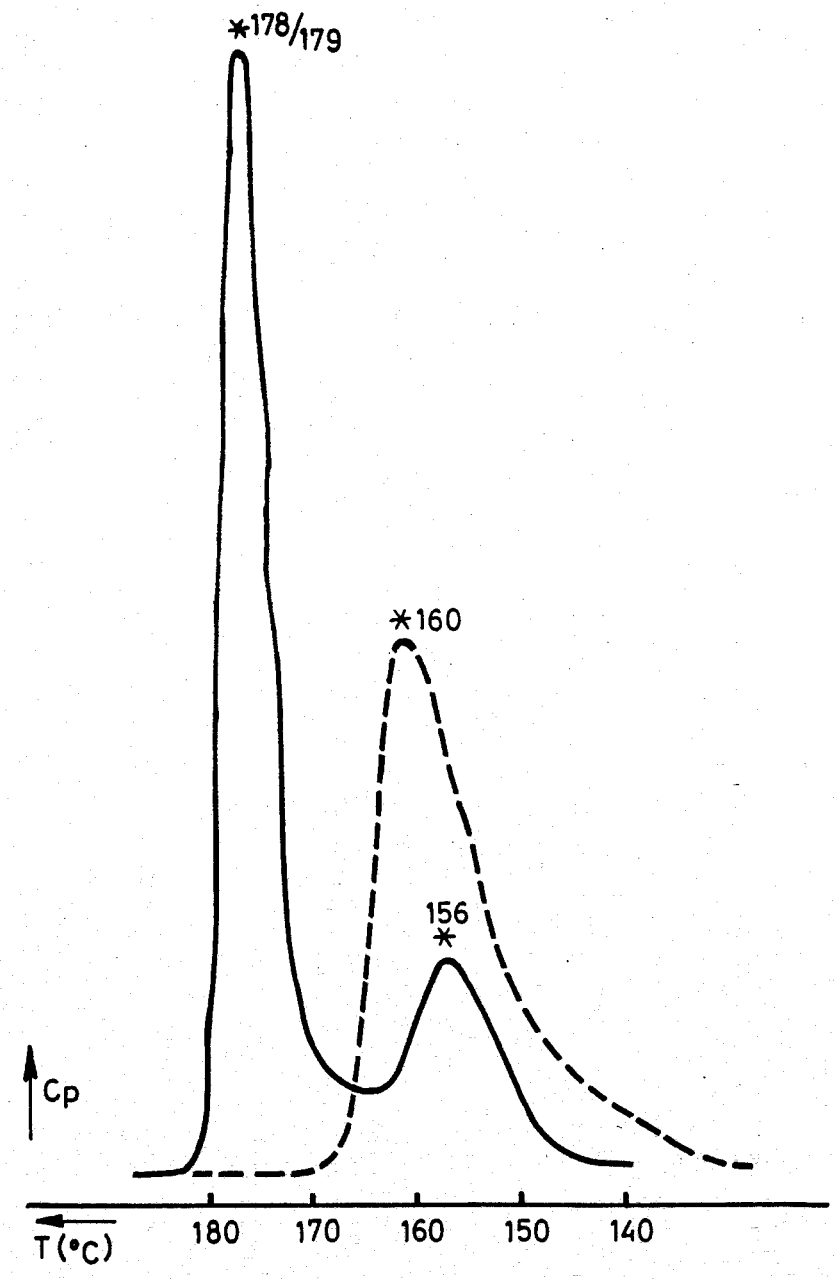
FIG. 2 is a DSC diagram.

In a co-extruded polypropylene surrounded by polystyrene and extruded through a nozzle at about 170° C. the X-ray diffraction diagram (see FIG. 1) shows lines at different levels indicating the presence of a monocline unit cell having the values a = 6.65; b = 20.96; c = 6.50 (helix direction) $\beta = 99°20'$. Furthermore a DSC diagram (see FIG. 2) clearly shows a high melting point of the polypropylene at 178°–179° C. indicating the presence of the extended chain crystal form of the polypropylene.

The invention also relates to a method for manufacturing a reinforced polymer product by extruding or injection molding a thermoplastic basic plastic and reinforcing plastic products through a nozzle according to which method to the basic plastic polymer articles, particles are added of a reinforcing polymer being more orientatable and crystallizable than the basic plastic, whereupon during the extrusion or injection molding said particles have a temperature of at most 10° C. above the melting point of the reinforcing polymer, when passing through said nozzle the particles of the more orientatable and crystallizable reinforcing polymer are orientated in a molecular manner by stretching and the more orientatable and crystallizable reinforcing polymer crystallizes, whereas the plasticized basic plastic remains liquid.

In order to mix the basic plastic and the strongly crystallizable reinforcing polymer, or prior to the latter action, it is recommended to control the temperature and pressure during the extrusion or the injection molding operation.

It is particularly recommended to effect a deformation of the particles of the more strongly crystallizable reinforcing polymer to a degree as high as possible. For, the latter will result in a greater length/diameter ratio of the stretched more strongly orientatable and crystallizable reinforcing polymer particles. For that purpose use is made of the fact that, at an increasing length/diameter ratio, the rigidifying action of oblong elements such as filaments, will be increased to a greater extent. To produce the reinforced polymer products, the temperature in the injection opening of an injection molding apparatus, the extrusion nozzle of an extruder respectively, will be lower than in the preceding portions of the two installations for receiving and melting the composition of basic thermoplastic and reinforcing polymer elements. Said temperature is preferably such that in the injection opening, the extrusion nozzle respectively, the more strongly orientatable and crystallizable polymer will crystallize whereas the basic plastic will not crystallize.

In processing a compound of high density and low density polyethylene, the temperature in the mixing zone of an extruder will amount to 170° C., whilst the temperature in the extruder nozzle will then be comprised between 130° to 135° C.

The basic plastic may, for example, consist of amorphous polyvinylchloride, the particles of the more strongly orientatable and crystallizable reinforcing polymer consisting of polyethylene or polypropylene.

A compound consisting of polymers of the same type can, however, also be used, the more strongly crystallizable reinforcing polymer then having a moleculair weight higher than the molecular weights of the polymers used in the basic plastic.

Conveniently a compound consisting of a high density polyethylene and another high density polyethylene, viz. a compound consisting of high density polyethylene having a higher molecular weight and high density polyethylene having a lower molecular weight, can be used.

If desired, starting compounds can be used, the core of the particles of a basic plastic comprising a quantity of a reinforcing polymer being more strongly orientatable and crystallizable than the basic plastic.

Very advantageously, the reinforced polymer products and therefore also the starting compound, consists of 10 to 70 vol.% of the reinforcing polymer, being more strongly orientatable and crystallizable than the basic plastic.

The present invention is particularly adapted to manufacture fibers reinforced threads, sheets, profiles or tubes.

The fiber reinforced sheets may also be formed in the form of strips, which can be employed for manufacturing wound tube consisting of reinforced polyvinylchloride or another plastic.

The present invention will be illustrated by means of a number of examples.

EXAMPLE I

An extruder having a temperature of 230° C. in the mixing zone, and a temperature of the filaments in the extrusion nozzle amounting to 170° C., is fed with a compound of 500 kg of amorphous polyvinylchloride and 95 kg polypropylene.

A reinforced polymer product comprising fibers of stretched crystallized polypropylene, is obtained.

The reinforced polyvinylchloride products present substantially higher strength properties than polyvinylchloride products without crystalline polyethylene fibers.

EXAMPLE II

Particles are formed consisting of a core of high density polyethylene being surrounded by low density polyethylene. Processing this compound in an extruder provides a reinforced polymer product, the reinforcement consisting of crystallized high density polyethylene fibers having been crystallized by orientation of the high density polyethylene and by maintaining the temperature of the high density polyethylene in the extrusion nozzle at the melting temperature of said high density polyethylene. The ratio of the high density polyethylene and the low density polyethylene is 45:55.

EXAMPLE III

A compound consisting of high density polyethylene having a molecular weight of 140,000 and a high density polyethylene having a molecular weight of 7,000 is extruded by means of an extruder.

A reinforced polymer product is obtained by the presence of fibers of orientated crystallized high density polyethylene having the higher molecular weight.

The high density polyethylene having the lower molecular weight acts in this method as a basic plastic, which remains liquid during the crystallization of the high density polyethylene with the higher molecular weight.

The temperature of the reinforcing polymer in the extrusion nozzle corresponds to the melting temperature of the high density polyethylene with the molecular weight of 140,000.

EXAMPLE IV

An extruder for co-extrusion is fed with an amorphous polyvinylchloride, this polyvinylchloride being plasticized at a temperature of 230° C.

Just before the extrusion nozzle of the extruder, a flow of polypropylene is added.

The latter occurs in such a manner, that the amorphous polyvinylchloride, comprising a core of polypropylene is co-extruded. During the passage through the extrusion nozzle at a temperature of 170° C. the polypropylene core is stretched and orientated molecularly, causing said polypropylene to finally obtain a crystallized fibrous structure.

A product presenting extremely good strength properties is obtained. It is possible to separately control the pressure and temperature of the two plastic materials, to wit amorphous polyvinylchloride and polypropylene, so that optimum conditions can be used for obtaining the desired reinforcement.

EXAMPLE V

A compound of amorphous polycarbonate and nylon in a ratio comprised between 1:1 is used.

An article is obtained by injection molding said compound. During injection molding the nylon particles are stretched, thus causing them to be transferred into orientated crystallized nylon fibers.

EXAMPLE VI

A compound of amorphous polyvinylchloride and polypropylene in a ratio of approximately 1:1 is formed. Under different stretch conditions reinforced polyvinylchloride extrusion products are formed from this compound, the temperature of the polypropylene in the extrusion nozzle of the extruder being 170° C.

It has appeared that a greater total deformation of the polypropylene particles will lead to a greater strength and rigidity corresponding to the fact that the rigidity of the fibers strongly increases at an increased length/diameter ratio.

EXAMPLE VII

Example VI is repeated, but the molecular weight distribution of the two substances is controlled.

It has appeared that an optimum strength is obtained provided that conditions regarding geometric, temperature and transport velocity for each compound of particles are adapted.

EXAMPLE VIII

Example VI repeated by using poypropylene particles of 8 mm$^3$ which are stretched 30 times, to a length of 40 mm and a diameter of 0,5 mm, which means a length/diameter ratio of 80. Preferably during the stretching operation the fibers are yet made thinner.

The length/diameter ratio preferably ranges from 50 to 100.

EXAMPLE IX

A compound of slightly crosslinked polyethylene and non crosslinked polyethylene in a ratio of 1:1 is extruded. The slightly crosslinked polyethylene particles are stretched to a length/diameter=100, whereby fibers having a thickness of 0,4 mm are obtained. The temperature in the extrusion nozzle substantially corresponds to the melting temperature of the slightly crosslinked polyethylene.

EXAMPLE X

A compound of high density polyethylene and nylon (1:1) is extruded to threads comprising highly orientated nylon fibers, the temperature of the nylon in the extruder nozzle being 230° C.

After cooling, the threads are cut to small granules, which are molded to an article in an injection molding machine at a temperature not reaching the melting point of nylon.

What is claimed is:

1. A reinforced polymer product produced by extrusion or injection molding melted plastics through a nozzle, said product comprising a thermoplastic basic polymer and reinforcing fibrous polymer elements which comprise oblong elements of a reinforcing polymer more stongly orientated and crystallized than the basic polymer, said elements at least being molecularly oriented during the molding of the polymer product by conveying the plasticized basic polymer surrounding the still melted elements of the reinforcing polymer at a temperature of at most 10° C. above the melting point of the reinforcing polymer while passing through the nozzle so that the elements of the reinforcing polymer are able to crystallize at a temperature near the melting point of the reinforcing polymer while surrounded by the still melted basic polymer, the articles as moulded comprising 10–70% by volume of the reinforcing polymers.

2. A reinforced polymer product as claimed in claim 1, wherein the oblong elements consist of a crosslinked polymer.

3. A reinforced polymer product as claimed in claim 1, wherein the oblong elements of the more strongly orientatable and crystallizable reinforcing polymer are obtained by adding the more strongly orientatable and crystallizable polymer to the basic polymer just before the extrusion nozzle.

4. A reinforced polymer product as in claim 1, wherein the temperature of the still liquid elements is substantially equal to the melting point of the reinforcing polymer.

5. A reinforced polymer product according to claim 1, wherein the oblong elements consist of single crystals.

* * * * *